(12) United States Patent
Takada et al.

(10) Patent No.: US 7,740,722 B2
(45) Date of Patent: Jun. 22, 2010

(54) STEEL FOR USE IN HIGH STRENGTH PINION SHAFT AND MANUFACTURING METHOD THEREOF

(75) Inventors: Katsunori Takada, Aichi (JP); Koichiro Inoue, Aichi (JP); Katsushi Goto, Osaka (JP); Atsuhiko Ohta, Nara (JP); Tomoyuki Takei, Osaka (JP)

(73) Assignee: JTEKT Corporation, Chuo-ku, Osaka (JP)

( * ) Notice: Subject to any disclaimer, the term of this patent is extended or adjusted under 35 U.S.C. 154(b) by 0 days.

(21) Appl. No.: 10/762,559

(22) Filed: Jan. 23, 2004

(65) Prior Publication Data

US 2004/0202567 A1 Oct. 14, 2004

(30) Foreign Application Priority Data

Jan. 23, 2003 (JP) ............... P. 2003-014208

(51) Int. Cl.
*C21D 7/13* (2006.01)
*C21D 1/02* (2006.01)

(52) U.S. Cl. ........................... 148/567; 148/624

(58) Field of Classification Search ........... 420/8, 420/123, 121; 148/624, 567
See application file for complete search history.

(56) References Cited

U.S. PATENT DOCUMENTS

| | | | |
|---|---|---|---|
| 5,279,688 A | | 1/1994 | Isokawa et al. |
| 5,545,267 A | | 8/1996 | Ochi et al. |
| 5,820,706 A | * | 10/1998 | Bellus et al. ............... 148/649 |
| 5,922,145 A | * | 7/1999 | Watari et al. ............... 148/320 |
| 6,270,596 B1 | | 8/2001 | Iguchi et al. |
| 6,319,337 B1 | | 11/2001 | Yoshida et al. |
| 6,332,714 B1 | | 12/2001 | Takemura et al. |
| 6,383,311 B1 | * | 5/2002 | Ochi et al. ............... 148/328 |
| 6,395,108 B2 | * | 5/2002 | Eberle et al. ............... 148/330 |
| 6,475,305 B1 | * | 11/2002 | Watari et al. ............... 148/320 |
| 6,547,890 B2 | * | 4/2003 | Kanisawa et al. ......... 148/320 |
| 6,602,359 B1 | * | 8/2003 | Ochi et al. ............... 148/330 |
| 6,632,296 B2 | * | 10/2003 | Yoshinaga et al. ........ 148/320 |
| 2001/0015245 A1 | * | 8/2001 | Eberle et al. ............... 148/624 |
| 2002/0139451 A1 | * | 10/2002 | Ishida et al. ............... 148/333 |
| 2002/0173363 A1 | * | 11/2002 | Makino et al. ............. 464/182 |

FOREIGN PATENT DOCUMENTS

| | | |
|---|---|---|
| EP | 0 487 250 A1 | 5/1992 |
| EP | 0 643 148 A1 | 3/1995 |
| JP | 01156420 A * | 6/1989 |
| JP | 02-179841 | 7/1990 |
| JP | 5-125438 | 5/1993 |
| JP | 7-90380 | 4/1995 |
| JP | 08-053714 | 2/1996 |
| JP | 08-253842 | 10/1996 |
| JP | 8-283910 | 10/1996 |
| JP | 9-195000 | 7/1997 |
| JP | 10-8189 | 1/1998 |
| JP | 10-195589 | 7/1998 |
| JP | 11-29836 | 2/1999 |
| JP | 11-131176 | 5/1999 |
| JP | 11-236644 | 8/1999 |
| JP | 2001-192731 | 7/2001 |
| JP | 2001-234242 | 8/2001 |
| JP | 2002-60901 | 2/2002 |
| JP | 2002-194483 | 7/2002 |

OTHER PUBLICATIONS

Machined English translation of Japanese patent 11029836 dated Feb. 2, 1999.*
French Office Action dated Aug. 16, 2004.
German Office Action dated Nov. 2, 2006 with English Translation.
Japanese Office Action dated Sep. 9, 2008, with English translation.

* cited by examiner

*Primary Examiner*—George Wyszomierski
*Assistant Examiner*—Tima M McGuthry-Banks
(74) *Attorney, Agent, or Firm*—McGinn IP Law Group PLLC

(57) ABSTRACT

A steel for use in high strength pinion shaft which is not refined and used by applying high frequency hardening, with less occurrence of peeling during hobbing, having high surface hardness, impact value and torsional strength after high frequency hardening, and with less heat treatment strains during high frequency hardening, containing, on the mass % basis; C: 0.45-0.55%, Si: 0.10-0.50%, Mn: 0.50-1.20%, P: 0.025% or less, S: 0.025% or less, Mo: 0.15-0.25%, B: 0.0005-0.005%, Ti: 0.005-0.10%, and N: 0.015% or less, satisfying: $0.80 \leq Ceq \, 0.95$ and f value $\leq 1.0$, and the balance of Fe and inevitable impurities, as well as a manufacturing method thereof.

6 Claims, No Drawings

STEEL FOR USE IN HIGH STRENGTH PINION SHAFT AND MANUFACTURING METHOD THEREOF

BACKGROUND OF THE INVENTION

The present invention concerns a steel for use in high strength pinion shaft for manufacturing a pinion shaft used in automobile steering systems, as well as a manufacturing method thereof.

In existent steering systems, rack & pinion systems utilizing an oil pressure have been predominant in which pinion shafts are used for the systems. The pinion shaft serves as a part for transmitting a rotational torque when a driver operates a steering wheel and converting rotational motion to linear motion by meshing with a geared portion of a rack bar, and it is one of important parts in the steering system.

The pinion shaft is manufactured by the combination of steel species and surface hardening heat treatment, for example, using case hardened steel (for example, JIS SMnC420, SCM420) and applying carburization hardening and tempering, or using carbon steel (for example, JIS S45C) or tough and hard steel (for example, JIS SCM440, SCM445) and applying high frequency hardening and tempering.

However, carburization hardening and tempering to the case hardened steel involves a problem of increasing the heat treatment cost and occurrence of heat treatment strains or abnormal heat treated layers.

On the other hand, in a case of applying high frequency hardening and tempering to carbon steels or tough and hard steels, while the cost is reduced and strains are decreased compared with carburization hardening and tempering to the case hardened steel, it results in a problem of increasing the cost by refining in a case of using a material applied with a refining treatment in order to ensure the inner hardness of the pinion shaft and easiness for high frequency hardening. On the other hand, in a case of using a not-refined steel instead of the material applied with the refining treatment, it results in a problem of lowering the performance of the pinion shaft because of low impact strength.

As the not-refined steel for use in shaft such as pinion shaft, JP-A No. 09-195000 discloses a not-refined steel containing: C: 0.20-0.50%, Si: 0.05-0.70%, Mn: exceeding 0.60 and up to 1.00%, S: 0.01-0.07%, V: 0.02-0.50%, N: 0.002-0.03%, P: 0-0.050%, Cu: 0-0.30%, Ni: 0-0.30%, Cr: 0-1.00%, Mo: 0-0.30, Al: 0-0.050%, Pb: 0-0.30%, Ca: 0-0.0100%, Te: 0-0.10%, Bi: 0-0.100% and the balance of Fe and inevitable impurities in which $fn1 \geqq 0$ and $fn2 \leqq 0$; $fn1=C+(Si/10)+(Mn/6)+5N+1.65V+(Cr/3)-0.6$, $fn2=[C/(fn1+0.6)]-0.6$.

Further, gear cutting is conducted in the manufacturing steps of the pinion shaft. Depending on the material used upon gear cutting, the geared surface is sometimes roughened to deteriorate the tooth form accuracy due to the effects of hardness and tissue (particularly, in those not applied with pre-heating treatment such as refining and annealing). When the form accuracy is lowered, since the state of the meshing surface in the tooth portion of rack and pinion is worsened, the wear resistance or pitting resistance is sometimes deteriorated. Further, depending on the lowering for the tooth form accuracy, state of friction at the gearing surfaces changes greatly to result in a problem of lowering the feeling in steering.

Further, for coping with the energy saving demand in view of recent global ecological problems, electromotive type power steering utilizing motors (EPS) have been developed and tended to be used more and more instead of hydraulic power steerings.

EPS sometimes have assist mechanisms different from those in the existent steering systems and, particularly, in a type of assisting the rotational torque of the pinion shaft, since larger force exerts on the meshing portion for the teeth portion of the rack and pinion, compared with the existent systems, the working conditions tend to become severer compared with the existent systems.

In a case where steels free of the refining treatment, that is, not-refined steels are put to gear cutting as they are by a hob or the like, this results in a problem that the gear cut surface becomes roughened to deteriorate the tooth fore accuracy and lower the wear resistance or pitting resistance. Further, in a case where high frequency hardening is applied to usual not-refined steels, since they have high ferrite content, ferrite remains in the high frequency hardened layer under usual high frequency heating conditions, failing to obtain a predetermined surface hardness thereby resulting in a problem of lowering the wear resistance and the pitting resistance. In a case where heating is conducted at higher temperature or for longer time as high frequency heating conditions in order not to remain ferrite, this results in a problem that the depth of the hardened layer increases to cause large heat treatment strains or crystal grains growth to lower the strength. Further, in a case of applying high frequency hardening to existent not-refined steels, it results in a problem of failing to obtain desired strength to torsion, bending, impact torsion or impact bending.

SUMMARY OF THE INVENTION

For solving the subject described above, the present invention intends to overcome the foregoing problems and provide a steel for use in high strength pinion shaft which is not refined and used by high frequency hardening, with less occurrence of peeling upon hobbing, having higher surface hardness and impact value and torsional strength after high frequency hardening, and with less heat treatment strains, as well as a manufacturing method thereof. The present inventors have made an earnest study on steels for use in a pinion shaft with less occurrence of peeling upon hobbing, less heat treatment strains upon high frequency hardening and having high surface hardness, impact value and torsional strength, and have found that occurrence of peeling upon hobbing can be prevented mainly by optimizing the ingredient composition and refining the micro-tissue, occurrence of heat treatment strains during high frequency hardening can be suppressed mainly by optimizing the ingredient composition and adjusting the tissue before high frequency hardening, and that the pitting resistance and the wear resistance of the pinion shaft can be improved by optimizing the hardness of the high frequency hardened layer and the C-content that gives a significant effect on the hardness.

Further, it has been found that strength to torsion, bending, impact torsion and impact bending can be improved mainly by combinational addition of ingredients, particularly, of Mo and B and controlling the tissue before high frequency hardening, the ingredient composition may be defined as the ingredient composition described in the scope of the claim for patent and the tissue can be rendered into a three-phase texture of ferrite+pearlite+bainite in which the ferrite area ratio is 40% or less, and the maximum pearlite block size is 100 μm or less as a circle-equivalent diameter, by fabricating the steel of the ingredient composition described above at a temperature of 850° C. or lower and under a draft at an area reduction of 10% or less.

The invention can be achieved based on the findings described above.

That is, a steel for use in high strength pinion shaft contains; C: 0.45-0.55%, Si: 0.10-0.50%, Mn: 0.50-1.20%, P: 0.025% or less, S: 0.025% or less, Mo: 0.15-0.25%, B: 0.0005-0.005%, Ti: 0.005-0.10% and N: 0.015% or less and, further, optionally, containing one or more of elements of Cu: 0.50% or less, Ni: 0.50% or less and Cr: 0.50% or less and, further contains, optionally, one or more elements of Nb: 0.20% or less, Ta: 0.20% or less, Zr: 0.10% or less, and Al: 0.10% or less and satisfies the following relation 1 and relation 2 with the balance of Fe and inevitable impurities:

$$0.80 \leq Ceq \leq 0.95 \quad \text{Relation 1}$$

in which $Ceq=C+0.07\times Si+0.16\times Mn+0.20\times Cr+0.72\times Mo$ $$f \text{ value} \leq 1.0 \quad \text{Relation 2}$$

where f value=$2.78-3.2\times C+0.05\times Si-0.60\times Mn-0.55\times Cu-0.80\times Ni-0.75\times Cr$ Further, a steel for use in high strength pinion shaft contains; C: 0.45-0.55%, Si: 0.10-0.50%, Mn: 0.50-1.20%, P: 0.025% or less, S: 0.025% or less, Mo: 0.15-0.25%, B: 0.0005-0.005%, Ti: 0.005-0.10% and N: 0.015% or less and, further, optionally, containing one or more of elements of Cu: 0.50% or less, Ni: 0.50% of less and Cr: 0.50% or less and further contains, optionally, one or more elements of Nb: 0.20% or less, Ta: 0.20% or less, Zr: 0.10% or less and Al: 0.10% or less and satisfies the following relation 1 and relation 2 with the balance of Fe and inevitable impurities, in which the tissue after hot rolling is a 3-phase texture of ferrite+pearlite+bainite, the ferrite area ratio is 40% or less and the maximum pearlite block size is 100 μm or less in a circle-equivalent diameter, the hardness after hot rolling is 24 to 30 HRC, the surface hardness after high frequency hardening is 650 HV or more, and the old austenite crystal grain size in the hardened layer is 8 or more in view of grain size number:

$$0.80 \leq Ceq \leq 0.95 \quad \text{Relation 1}$$

in which $Ceq=C+0.07\times Si+0.16\times Mn+0.20\times Cr+0.72\times Mo$ $$f \text{ value} \leq 1.0 \quad \text{Relation 2}$$

where f value=$2.78-3.2\times C+0.05\times Si-0.60 \times Mn-0.55\times Cu-0.80\times Ni-0.75\times Cr$ Further, in the method of manufacturing a steel for use in high strength pinion shaft according to the invention, a steel containing: C: 0.45-0.55%, Si: 0.10-0.50%, Mn: 0.50-1.20%, P: 0.025% or less, S: 0.025% or less, Mo: 0.15-0.25%, B: 0.0005-0.005% Ti: 0.005-0.10% and N: 0.015% or less, and further, optionally, containing one or more of elements of Cu: 0.50% or less, Ni: 0.50% of less and Cr: 0.50% or less and further contains, optionally, one or more elements of Nb: 0.20% or less, Ta: 0.20% or less, Zr: 0.10% or less, and Al: 0.10% or less and satisfying the following relation 1 and relation 2 with the balance of Fe and inevitable impurities, is put to working at a temperature of 850° C. or lower and under a draft ratio at a area reduction of 10% or more:

$$0.80 \leq Ceq \leq 0.95 \quad \text{Relation 1}$$

where $Ceq=C+0.07\times Si+0.16\times Mn+0.20\times Cr+0.72\times Mo$ $$f \text{ value} \leq 1.0 \quad \text{Relation 2}$$

where f value=$2.78-3.2\times C+0.05\times Si-0.60\times Mn-0.55\times Cu-0.80\times Ni-0.75\times Cr$ The steel for use in high strength pinion shaft according to the invention, having the constitution as described above, causes less occurrence of peeling during hobbing, has high surface hardness, impact value and torsional strength after high frequency hardening, and suffers from less heat treatment strains during high frequency hardening. Since the steel for using high strength pinion shaft has high surface hardness, impact value and torsional strength after the high frequency hardening, it can be used also in electromotive type power steerings that undergo severe working conditions among the steering systems and, further, can reduce the weight corresponding to the size-reduction of the steering systems.

Further, according to the method of manufacturing the steel for use in high strength pinion shaft of the invention, having the constitution described above, the tissue after the hot rolling is a three-phase texture of ferrite+pearlite+bainite, the ferrite area ratio is 40% or less and the maximum pearlite block size is 100 μm or less as a circle-equivalent diameter and, further, the hardness after hot rolling is 24 to 30 HRC, the surface hardness after high frequency hardening is 650 HV or more and the crystal grain size of old austenite in the hardened layer is 8 or more in view of grain size number, so that the steel for use in high strength pinion shaft having the properties described above can be manufactured.

DETAILED DESCRIPTION OF THE EMBODIMENT

Then, the reason for specifying the ingredient composition, Ceq and f value of the steel for use in high strength pinion shaft according to the invention is to be described.

C: 0.45-0.55%

Since C increases the hardness of the high frequency hardened layer and improves the pitting resistance or the wear resistance, it is an element incorporated for this purpose. It is necessary to incorporate C by 0.45% or more in order to obtain the function and effect described above but, in a case where the content is excessive, since the strength to torsion, bending, impact torsion, impact bending, etc. of the high strength pinion shaft is lowered, the upper limit is defined as 0.55%.

Si: 0.10-0.50%

Since Si has an deoxidizing effect during melting of steels, the element is incorporated for this purpose. It is necessary to incorporate Si by 0.10 or more for obtaining the function and the effect. However, since the toughness of the steel is deteriorated if the content is excessive, the upper limit is defined as 0.50%.

Mn: 0.50-1.20%

Since Mn has a deoxidation effect during melting of steels and improves the hardenability of the steels, the element is incorporated for this purpose. It is necessary to incorporate Mu by 0.50% or more for obtaining the function and the effect. However, since the hardness is excessively increased if the content is excessive, the upper limit is defined as 1.20%.

P: 0.025% or Less

Since P is an inevitable impurity, segregates at the grain boundary to lower the toughness and promotes the occurrence of quenching crack upon high frequency hardening, lower P content is preferred. However, since even when it is lowered as the content is lower, the effect is saturated and the cost is increased, the upper limit is defined as 0.025%.

S: 0.025% or Less

Since S is an inevitable impurity and forms sulfide type inclusions to form triggers for fatigue fracture and, accordingly, lowers the fatigue strength causing quenching crack, it is preferably lower However, since the machinability is deteriorated when the content is remarkably lower, the upper limit is defined as 0.025%.

Mo: 0.15-0.25%

Since Mo improves the hardenability and improves the resistance to the effect of impact stress in the hardened layer obtained by high frequency hardening to increase the resistance to impact crack developing energy, the element is incorporated for this purpose. It is necessary to incorporate Mo by 0.15% or more in order to obtain the effect. However, since martensite is generated in a rolled state to increase the hardness and deteriorate the machinability in a case where it is incorporated by a great amount, the upper limit is defined as 0.25%. Further, when it is added in combination with B, the toughness improving effect for the high frequency hardened layer can be promoted further.

B: 0.0005-0.005%

Since B improves the hardenability and suppresses grain boundary segregation of P to improve the toughness of the high frequency hardened layer, the element is incorporated for this purpose. It is necessary to incorporate B by 0.0005% or more in order to obtain the effect. However, since the crystal grains grow tog deteriorate the toughness if it is contained excessively, the upper limit is defined as 0.005%. Further, when it is added in combination with Mo, the effect of improving the toughness of the high frequency hardened layer is further promoted.

Ti: 0.005-0.10%

Since Ti forms TiN to fix N in the steel and hinders formation of BN to increase the effective amount of B, the element is incorporated for this purpose. It is necessary to incorporate Ti 0.005% or more in order to fix N and provide the abovementioned effect of B. However, since the toughness is lowered if it is contained excessively, the upper limit is defined as 0.10%.

N: 0.015% or Less

Since N is an inevitable impurity and forms a nitride type non-metal inclusions in the steel to lower the fatigue strength of the pinion shaft to be manufactured, the Upper limit is defined as 0.015%.

Cu: 0.50% or Less

Cu may be incorporated for controlling the f value. However, since it deteriorates the hot workability of steel when contained in a great amount, the upper limit is defined as 0.50% or less.

Ni: 0.50% or Less

Ni may be incorporated for controlling the f value. however, since it deteriorates the machinability of steel when contained in a great amount, the upper limit is defined as 0.50% or less.

Cr: 0.50% or Less

Cr may be incorporated for controlling the f value. However, since the hardenability of the steel increases to form. martensite in the rolled state to increase the hardness and deteriorate the machinability when it is contained in a great amount, the upper limit is defined as 0.50%.

Nb: 0.02% or Less, Ta: 0.20% or Less

Since Nb and Ta. refine the tissue of the high frequency hardened layer to improve the toughness, the elements are incorporated for the purpose. However, since the effect is saturated when they are contained in a great amount, the upper limit is defined as 0.20%.

Zr: 0.10% or Less

Since Zr refines the tissue of the high frequency hardened layer to improve the toughness and forms oxides as nuclei of sulfides and improves the ductility of MnS to form granular sulfides and, accordingly, improves the resistance to torsional fatigue, the element is incorporated for this purpose. However, since the effect is saturated when it is contained a great amount, the upper limit is defined as 0.10%.

Al: 0.10% or Less

Since Al has a strong deoxidation effect during melting of steel and refines the crystal grains to improve the toughness, the element is incorporated for this purpose However, since $Al_2O_3$ type inclusions increase to lower the fatigue strength when contained in a great amount, the upper limit is defined as 0.10%.

$$0.80 \leq Ceq \leq 0.95$$

where $Ceq=C+0.07 \times Si+0.16 \times Mn+0.20 \times Cr+0.72 \times Mo$

The hardness in the state as hot rolled is determined mainly depending on the chemical composition of the steel, size of the rolled material, rolling conditions and cooling conditions. In a case of a steel for use in pinion shaft, since the size of the steel material is 20 to 30 mm in the diameter, the hot rolling conditions are: at a temperature of 850° C. or lower and under a draft at an area reduction ratio of 10% or more, and the cooling method is an air blast cooling, spontaneous atmospheric cooling or pot cooling not undergoing remarkable increase in the cost, the hardness is substantially determined by the magnitude of Ceq. For making the hardness to 24-30 HRC necessary for the steel for use in the pinion shaft (to be described later specifically), it is necessary that Ceq is from 0.80 to 0.95. This is because the hardness after hot rolling is not 24 HRC or more when Ceq is less than 0.80. On the other hand, hardness increases excessively to greater than 30 HRC, to lower the machinability if Ceq is larger than 0.95.

$$f\ value \leq 1.0$$

where $f\ value=2.78-3.2 \times C+0.05 \times Si-0.60 \times Mn-0.55 \times Cu-0.80 \times Ni-0.75 \times Cr$ The amount of ferrite is determined mainly depending on chemical composition of steel, size of the rolled material, rolling conditions and cooling conditions. In a case of a steel for use in pinion shaft, since the size of the steel material is 20 to 30 mm in the diameter, the hot rolling conditions are; at a temperature of 850° C. or lower and under a draft at an area reduction ratio of 10% or more, and the cooling method is a shot blow cooling, spontaneous atmospheric cooling or pot cooling not undergoing remarkable increase in the cost, the amount of ferrite is substantially determined depending on the magnitude of the f value. For making the amount of ferrite to 40% or less necessary for the steel for use in pinion shaft (to be described later specifically), it is necessary that the f value is 1.0 or less. This is because the ferrite amount can not be 40% or less which is necessary for the steel for use in pinion shaft in a case where the f value is larger than 1.0.

Then, the reason of specifying the tissue after hot rolling, the ferrite area ratio and the maximum pearlite block size, hardness after hot rolling and surface hardness and the old austenite crystal grain size after the high frequency heating as described above is to be described.

Tissue After Hot Rolling: Three-Phase Texture Ferrite+Pearlite+Bainite

Since the hardness increases remarkably and the impact value is lowered when the martensite is present, it is formed as a three-phase texture of ferrite+pearlite+bainite.

Ferrite Area Ratio: 40% or Less

In a case where a great amount of ferrite is present in the tissue before high frequency hardening, diffusion of C in the ferrite is insufficient in a short time heat treatment such as high frequency hardening and ferrite remains in the tissue after the high frequency hardening. The remained ferrite lowers the bending and torsional strength. In addition, it is difficult to obtain uniform hardness and the wear resistance is also deteriorated. For decreasing the remained ferrite, it may be considered to conduct heating for a longer tine or at a higher temperature in the high frequency hardening. However, when heating is conducted for a long time, the depth of the hardened layer increases to increase the strains in the pinion shaft to be manufactured and it also deteriorates the fatigue strength by the lowering of the residual stress near the surface. In a case of heating at a higher temperature, crystal grains in the high frequency hardened layer grow to lower the toughness. Accordingly, it is desirable that the amount of ferrite before high frequency hardening is restricted to 40% or less. Further, the amount for pearlite and bainite is not restricted since they are less deleterious compared with ferrite.

Maximum Pearlite Block Size: 100 μm or Less in the Circle-Equivalent Diameter

For suppressing occurrence of peeling during hobbing, it is effective to refine the tissue. This is because peeling occurs particularly to cause peeling during hobbing if the pearlite block size is coarse. When the surface finishing accuracy of a practical pinion shaft is taken into consideration, it is necessary to restricted the circle-equivalent diameter of the pearlite block to 100 μm or less and, accordingly, the value is preferably 100 μm or less.

Hardness After Hot Rolling: 24-30 HRC

For ensuring the tool life in the machining of the pinion shaft and the strength of pinion shaft, the hardness is preferably 24-30 HRC. In a case where it is 24 HRC or less, strength necessary for the pinion shaft can not be obtained. On the contrary, if it is 30 HRC or more, the tool life is lowered to increase the cost and it takes a longer time for working.

Surface Hardness After High Frequency Hardening of 650 HV or More

For ensuring the strength and the wear resistance, particularly, ensuring the wear resistance of the pinion shaft, the surface hardness after the high frequency hardening is preferably 650 HV or more.

Old Austenite Crystal Grain Size of the Hardened Layer After High Frequency Hardening: Grain Size No. of 8 or More Since the toughness after high frequency hardening and tempering is lowered when the crystal grain size of the old austenite is large, it is preferred that the grain size No. of the old austenite crystal grain size is 8 or more.

Then, description is to be made to hot rolling conditions in the manufacturing method of steel for use in high strength pinion shaft of the invention.

The tissue is refined when the rolling temperature is low and the draft ratio is large but if the rolling temperature is excessively low or the draft ratio is excessively small, it exhibits not re-crystallized tissue to make the tissue coaser after rolling. In order to make the micro-tissue finer and the pearlite block size to be 100 μm or less in the steel material after rolling, it is necessary to conduct rolling at a temperature of 850° C. or lower and, preferably, 700° C. or higher under a draft ratio of 10% or more.

The steel for use in high strength pinion shaft of the invention has the ingredient composition within the range described above, satisfies the two relations described above and contains the balance of Fe and inevitable impurities, or the tissue after the hot rolling, the ferrite area ratio, the maximum pearlite block size, the hardness after hot rolling, the surface hardness after high frequency hardening and the old austenite crystal grain size in the hardened layer are further specified as described above, by the reasons described above.

In the method of manufacturing the steel for use in high strength pinion shaft of the invention, those materials having the ingredient composition within the range described above, satisfying the two relations described above and containing the balance of Fe and inevitable impurities are put to working at a temperature of 850° C. or lower and under a draft ratio at an area reduction of 10% or more by the reasons described above.

EXAMPLE

Then, description is to be made to examples of the present invention.

Example 1

After melting steels of examples of the invention and comparative examples of the following ingredient compositions shown in Table 1, they were formed into billets and hot rolled under a draft ratio of 15% at a temperature of 850° C. or lower into round rods each of 23 mmφ and then air cooled. From the round rods, were prepared test specimens for measuring the micro-tissue, the ferrite area ratio and maximum pearlite block size, test specimens for measuring the hardness of rolled materials, test specimens for hobbing, test specimen for measuring the hardness after the high frequency hardening, specimens for measuring strains by high frequency hardening and specimens for measuring torsional strength. Using the test specimens, measurement was conducted respectively by the following test methods. The results are shown in the following Table 2.

Measurement for Micro-Tissue, Ferrite Area Ratio and Maximum Pearlite Block Size Using the test specimens described above, the traverse cross section was ground, etched and then measured by an optical microscope.

Measurement for Rolled Material Hardness (Hardness after Rolling)

Hardness of the test specimens was measured by C-scale using a Rockwell hardness gage.

Measurement for Peeling in Hobbing

The test specimens for hobbing (15 mmφ for shaft portion, 22 mmφ for gear cut portion and 130 mm for length) were put to gear cutting by using a hob made of high speed steel at a rotational speed of 425 rpm and a feed rate of 0.73 mm/min, and the roughness at the cut surface was measured by a roughness measuring instrument.

Measurement for High Frequency Heating Hardness of the High Frequency Hardened Surface Test specimens reach of 20 mmφ and 150 mm length were prepared from round rods each of 23 mmφ as described above, heated by an high frequency heating apparatus at a surface heating temperature of about 900 to 1000° C. for a heating time from 2 to 5 sec, then cooled with water and tempered by heating at 170° C. The specimens used for the test were measured by using a Vickers hardness gage.

Measurement for High Frequency Heating Strains of Tooth Form

Pinion shafts each having a shaft portion of 15 mmφ, gear cut portion of 22 mmφ and 130 mm length were manufactured from round rods each of 23 mmφ described above, heated by an high frequency heating apparatus at a surface heating temperature of about 900 to 1000° C. for a heating time from 2 to 5 sec, then cooled with water and tempered by heating at 170° C. and then the tooth form accuracy was measured.

Measurement for Torsional Strength

Test specimens each of 12 mm diameter for the test portion were prepared from the round rods each of 23 mmφ described above, the test specimens were put to high frequency hardening and tempering, and the torsional strength was measured by a hydraulic type torsional tester.

TABLE 1

| No. | C | Si | Mn | P | S | Mo | B | Ti | N | Others | Ceq | f value |
|---|---|---|---|---|---|---|---|---|---|---|---|---|
| Examples of the present invention ||||||||||||| 
| 1 | 0.50 | 0.25 | 0.85 | 0.010 | 0.015 | 0.20 | 0.0017 | 0.04 | 0.008 | | 0.83 | 0.44 |
| 2 | 0.52 | 0.45 | 1.10 | 0.015 | 0.015 | 0.20 | 0.0015 | 0.04 | 0.008 | Cr: 0.30 | 0.93 | 0.12 |
| 3 | 0.45 | 0.25 | 1.00 | 0.015 | 0.015 | 0.23 | 0.0015 | 0.04 | 0.008 | | 0.82 | 0.50 |
| 4 | 0.50 | 0.21 | 0.78 | 0.016 | 0.017 | 0.17 | 0.0015 | 0.04 | 0.008 | Cr: 0.22 | 0.81 | 0.35 |
| 5 | 0.50 | 0.26 | 0.86 | 0.013 | 0.015 | 0.21 | 0.0015 | 0.04 | 0.007 | Cu: 0.35 Ni: 0.30 Cr: 0.25 | 0.84 | 0.41 |
| 6 | 0.54 | 0.26 | 0.74 | 0.016 | 0.015 | 0.17 | 0.0016 | 0.045 | 0.008 | | 0.85 | 0.00 |
| 7 | 0.50 | 0.28 | 0.86 | 0.017 | 0.016 | 0.22 | 0.0017 | 0.043 | 0.009 | Nb: 0.05 Al: 0.04 | 0.86 | 0.27 |
| 8 | 0.49 | 0.30 | 0.88 | 0.018 | 0.014 | 0.19 | 0.0015 | 0.044 | 0.008 | Ta: 0.08 Zr: 0.01 | 0.82 | 0.42 |
| 9 | 0.50 | 0.25 | 0.85 | 0.012 | 0.016 | 0.20 | 0.0017 | 0.040 | 0.007 | Cu: 0.33 Ni: 0.32 Cr: 0.21 Nb: 0.04 Al: 0.03 | 0.84 | 0.09 |
| 10 | 0.49 | 0.28 | 0.82 | 0.016 | 0.015 | 0.19 | 0.0013 | 0.040 | 0.009 | Cu: 0.30 Ni: 0.25 Cr: 0.18 Ta: 0.06 Al: 0.05 | 0.81 | 0.23 |
| Comparative Examples ||||||||||||| 
| 1 | 0.43 | 0.25 | 0.65 | 0.010 | 0.015 | 0.20 | 0.0015 | 0.04 | 0.008 | | 0.68 | 1.06 |
| 2 | 0.55 | 0.65 | 1.10 | 0.015 | 0.015 | 0.20 | 0.0016 | 0.04 | 0.008 | | 0.98 | 0.03 |
| 3 | 0.45 | 0.25 | 0.70 | 0.015 | 0.015 | 0.23 | 0.0015 | 0.04 | 0.008 | | 0.78 | 0.75 |
| 4 | 0.41 | 1.10 | 0.55 | 0.015 | 0.015 | 0.26 | 0.0015 | 0.04 | 0.008 | | 0.80 | 1.02 |
| 5 | 0.40 | 0.25 | 0.85 | 0.015 | 0.016 | 0.20 | 0.0016 | 0.04 | 0.008 | | 0.78 | 0.75 |
| 6 | 0.60 | 0.24 | 0.85 | 0.016 | 0.015 | 0.20 | 0.0019 | 0.04 | 0.010 | | 0.92 | 0.12 |
| 7 | 0.51 | 0.25 | 0.83 | 0.015 | 0.015 | 0.12 | 0.0015 | 0.04 | 0.008 | | 0.78 | 0.42 |
| 8 | 0.49 | 0.30 | 0.60 | 0.015 | 0.015 | 0.30 | 0.0015 | 0.04 | 0.008 | | 0.82 | 0.86 |
| 9 | 0.51 | 0.65 | 0.75 | 0.017 | 0.018 | 0.21 | 0.0002 | 0.035 | 0.010 | | 0.86 | 0.44 |
| 10 | 0.53 | 0.08 | 0.82 | 0.014 | 0.017 | 0.16 | 0.0078 | 0.11 | 0.018 | | 0.81 | 0.31 |

TABLE 2

| No. | Micro-tissue | Ferrite area ratio (%) | Maximum pearlite block size (μm) | Rolled material hardness (HRC) | Peeling in hobbing | Surface hardness of high frequency hardened material (HV) | Tooth form strain | Torsional strength (MPa) |
|---|---|---|---|---|---|---|---|---|
| Example of the Invention |||||||||
| 1 | F + P + B | 20 | 40 | 36.9 | small | 720 | small | 1780 |
| 2 | " | 6 | 53 | 29.7 | small | 760 | small | 1800 |
| 3 | " | 20 | 42 | 25.2 | small | 650 | small | 1670 |
| 4 | " | 13 | 40 | 24.4 | small | 715 | small | 1750 |
| 5 | " | 17 | 35 | 25.9 | small | 720 | small | 1750 |
| 6 | " | 1 | 55 | 26.3 | small | 718 | small | 1780 |
| 7 | " | 9 | 39 | 26.6 | small | 724 | small | 1770 |
| 8 | " | 14 | 38 | 25.0 | small | 710 | small | 1760 |
| 9 | " | 5 | 34 | 26.3 | small | 727 | small | 1790 |
| 10 | " | 10 | 32 | 25.1 | small | 709 | small | 1770 |
| Comparative Example |||||||||
| 1 | F + P + B | 45 | 45 | 20.0 | medium | 580 | medium | — |
| 2 | " | 5 | 62 | 31.6 | " | 730 | " | — |
| 3 | " | 30 | 61 | 25.2 | " | 620 | " | — |
| 4 | " | 42 | 46 | 24.3 | " | 570 | " | — |
| 5 | " | 31 | 48 | 21.2 | " | 540 | " | 1550 |
| 6 | " | 5 | 60 | 29.4 | " | 770 | small | 1450 |
| 7 | " | 20 | 56 | 23.2 | " | 720 | — | 1570 |
| 8 | F + P + B + M | 15 | 30 | 34.9 | " | 705 | — | — |
| 9 | F + P + B | 14 | 35 | 26.7 | small | 718 | small | 1340 |
| 10 | " | 28 | 39 | 24.6 | small | 734 | small | 1360 |

According to the results of Table 2, in each of the examples of the present invention, the micro-tissue was a three-phase texture comprising ferrite+pearlite+bainite, the ferrite area ratio is 20% or less, the maximum pearlite block size was 35 to 55 μm in the circle-equivalent diameter, the hardness of the rolled material (hardness after rolling) was 24.4 to 29.7 HRC and 36.9 HPC (example for claim 1), the surface hardness after high frequency hardening was 650 to 760 HV, peeling in hobbing was small, the tooth form strain was small and the torsional strength was 1670 to 1800 MPa.

On the contrary, in Comparative Example 1 in which the C content and Ceq were less than those of the invention and the f value was higher than that of the invention, the ferrite area ratio was larger than that in the examples of the invention, the hardness of the rolled material (hardness after rolling) was much lower than that of the examples of the invention and the peeling in hobbing and tooth form strain by the high frequency hardening were larger than those in the examples of the invention.

Further, in Comparative Example 2 in which the Si content was larger than that of the invention and Ceq was higher than that of the invention, the maximum pearlite block size was larger than that in the examples of the invention and peeling in hobbing and tooth form strain by high frequency hardening were larger than those in the examples of the invention.

Further, in Comparative Example 3 in which Ceq was somewhat lower than that in the invention, the ferrite area ratio was somewhat larger than that in the examples of the invention, the surface hardness after high frequency hardening was somewhat lower than that in the examples of the invention, and peeling in hobbing and tooth form strain by high frequency hardening were larger than those in the examples of the invention.

Further, in Comparative Example 4 in which the C content was somewhat less than that in the invention, the Si content was much more than that in the invention and the f value was higher than that in the invention, the ferrite area ratio was larger than that in the examples of the invention, the hardness of the rolled material was somewhat lower than that in the examples of the invention, the surface hardness after high frequency hardening was much lower than that in the examples of the invention and, further, peeling in hobbing and tooth form strain by high frequency hardening were larger than those in the examples of the invention.

Further, in Comparative Example 5 in which the C content was somewhat Less than that in the invention, and Ceq was lowered than that in the invention, the ferrite area ratio was somewhat larger than in the examples of the invention, the hardness of the rolled material and the surface hardness after high frequency hardening were much lower than those in the examples of the invention, further, peeling in hobbing and tooth form strain by high frequency hardening were larger than those in the examples of the invention, and the torsional strength was somewhat lower than that in the examples of the invention.

Further, in Comparative Example 6 in which the C content was more than that in the invention, the maximum pearlite block size was somewhat larger than that in the examples of the invention and, further, peeling in hobbing was larger than that in the examples of the invention and the torsional strength was rather lower than that in the examples of the invention.

Further, in Comparative Example 7, in which the Mo content was somewhat less than that in the invention and Cerq was somewhat lower than that in the invention, the hardness of the rolled material was somewhat lower than that in the examples of the invention and, further, peeling in hobbing and tooth form strain by high frequency hardening were larger than those in the examples of the invention, and the torsional strength was somewhat lower than that in the examples of the invention.

Further, in comparative Example 8 in which the Mo content was more than that in the invention, martensite was present in the tissue and peeling in hobbing was larger than that in the examples of the invention.

Further, in Comparative Example 9 in which the Si content was more than that in the invention and the B content was less than that in the invention, the torsional strength was much lower than that in the examples of the invention.

Further, in Comparative Example 10 in which the Ti content and the N content were somewhat more than those in the invention, the torsional strength was much lower than that in the examples of the invention.

Example 2

Test materials having the old austenite crystal grain size corresponding to the crystal grain size numbers described in the following Table 3 were prepared by using billets prepared in Example 1, and having ingredient compositions of Example 4 and Comparative Example 2 shown in Table 1, while controlling the heating temperature upon hot rolling to 1100 to 1250° C., the rolling temperature to 750 to 950° C., under the cooling conditions in the range of air blast cooling, atmospheric cooling or pot cooling, respectively. The following test specimens for measuring crack developing energy were prepared from the test materials and the following crack developing energy test was conducted. The results are shown in the following Table 3. The old austenite crystal grain size was measured by an optical microscope after polishing and etching the bottom cross section of a notch in the test specimen.

Crack Developing Energy Test

JIS 2 mm U-notch test pieces were heated at a surface heating temperature of 900 to 1100° C. for a heating time from 2 to 5 sec by an high frequency heating apparatus, then cooled with water and then tempered at 170° C. The crack developing energy was determined by using the test specimens by instrumented Shalpy test. The results are shown in the following Table 3.

TABLE 3

|  | No. | Tested material | Old austenite crystal grain size number in high frequency hardened layer | Crack developing energy (J) |
|---|---|---|---|---|
| Example of the invention | 11 | Example 4 | 8.6 | 15 |
|  | 12 | " | 10.5 | 20 |
| Comparative example | 11 | Comp. Example 2 | 5.5 | 6 |
|  | 12 | " | 8.5 | 9 |

According to the results in Table 3, the crack developing energy was 15 J and 20 J in Examples 11 and 12 of the invention having the old austenite crystal grain size of 8.6 and 10.5.

On the contrary, in Comparative Examples 11 and 12 having the old austenite crystal grain size of 5.5 and 8.5 (Comparative Example 2 as the test material has more Si content than that in the invention and higher Ceq than that in the invention), the crack developing energy was 6 J and 9 J, which was one-half or less than that in the example of the invention.

Example 3

Test specimens each of 53 mmφ and 5 mm thickness were prepared from pellets prepared in Example 1 and having the ingredient compositions of Examples 1, 3, 4, 6 and 7 and Comparative Examples 1, 4 and 6 in Table 1. After putting the test specimens to high frequency hardening and tempering, the surface hardness was measured and the amount of wear was measured by the following method. The results are shown in the following Table 4.

Measuring Test for Wear Loss

Wear test was conducted using the test specimens described above by a pin-on-disk type wear tester under the conditions at a load of 2 MPa, at a circumferential speed of 1 m/min, under dry lubrication, and using a mating pin of SUJ2 hardened/tempered material (62 HRC) and then the wear loss of the test material was measured.

TABLE 4

|  | No. | Test material | Surface hardness of high frequency hardened material (HV) | Wear loss (g) |
| --- | --- | --- | --- | --- |
| Example of the Invention | 13 | Example 1 | 720 | 0.002 |
|  | 14 | Example 3 | 650 | 0.004 |
|  | 15 | Example 4 | 715 | 0.003 |
|  | 16 | Example 6 | 718 | 0.002 |
|  | 17 | Example 7 | 724 | 0.002 |
| Comparative Example | 13 | Comp. Example 1 | 580 | 0.043 |
|  | 14 | Comp. Example 4 | 570 | 0.045 |
|  | 15 | Comp Example 6 | 540 | 0.060 |

According to the results in Table 4, in the examples of the invention, the surface hardness of the high frequency hardened material was 650 to 724 HV, and the wear loss was 0.002 to 0.004 g.

On the other hand, in the comparative examples, the surface hardness was 540 to 580 HV and the wear loss was 0.043 to 0.060 g which was ten times as large as that of the examples in the invention.

With the constitution as describe above, the steel for use in high strength pinion shaft according to the present invention can provide excellent effect of suffering from less peeling during hobbing, having high surface hardness, impact value and torsional strength after high frequency hardening, and has less heat treatment strains during high frequency hardening.

Further, the method of manufacturing the steel for use in high strength pinion shaft according to the invention, having the constitution as described above, can provide excellent effects capable of manufacturing steels for use in high strength pinion shaft with less occurrence of peeling during hobbing, having high surface hardness, impact value, and torsional strength after high frequency hardening and less heat treatment strains during high frequency hardening.

What is claimed is:

1. A method of manufacturing a steel for use in a high strength pinion shaft comprising:
   providing a steel;
   hot rolling the steel at a temperature of 700° C. to 850° C. under a draft ratio at an area reduction of 10%; and
   high frequency hardening the steel,
   wherein a hardness of said steel before the high frequency hardening and after hot rolling comprises a range of 24 HRC to 30 HRC, and
   wherein the steel is devoid of Cr, Cu, Ni and Al.

2. The method according to claim 1, wherein a pearlite block size of the steel is 100 μm or less as a circle equivalent diameter.

3. The method according to claim 1, wherein the steel comprises:
   0.45 wt %-0.55 wt % C;
   0.21 wt %-0.45 wt % Si
   0.50 wt %-1.20 wt % Mn; and
   0.15 wt %-0.25 wt % Mo.

4. The method according to claim 1, wherein a ferrite area ratio is 40% or less before high frequency hardening.

5. The method according to claim 1, wherein an old austenite crystal grain size in a hardened layer is 8 or more in view of grain size number.

6. The method according to claim 1, wherein a surface hardness of said steel after said high frequency hardening comprises 650 HV or more.

* * * * *